United States Patent Office 2,899,534
Patented Aug. 11, 1959

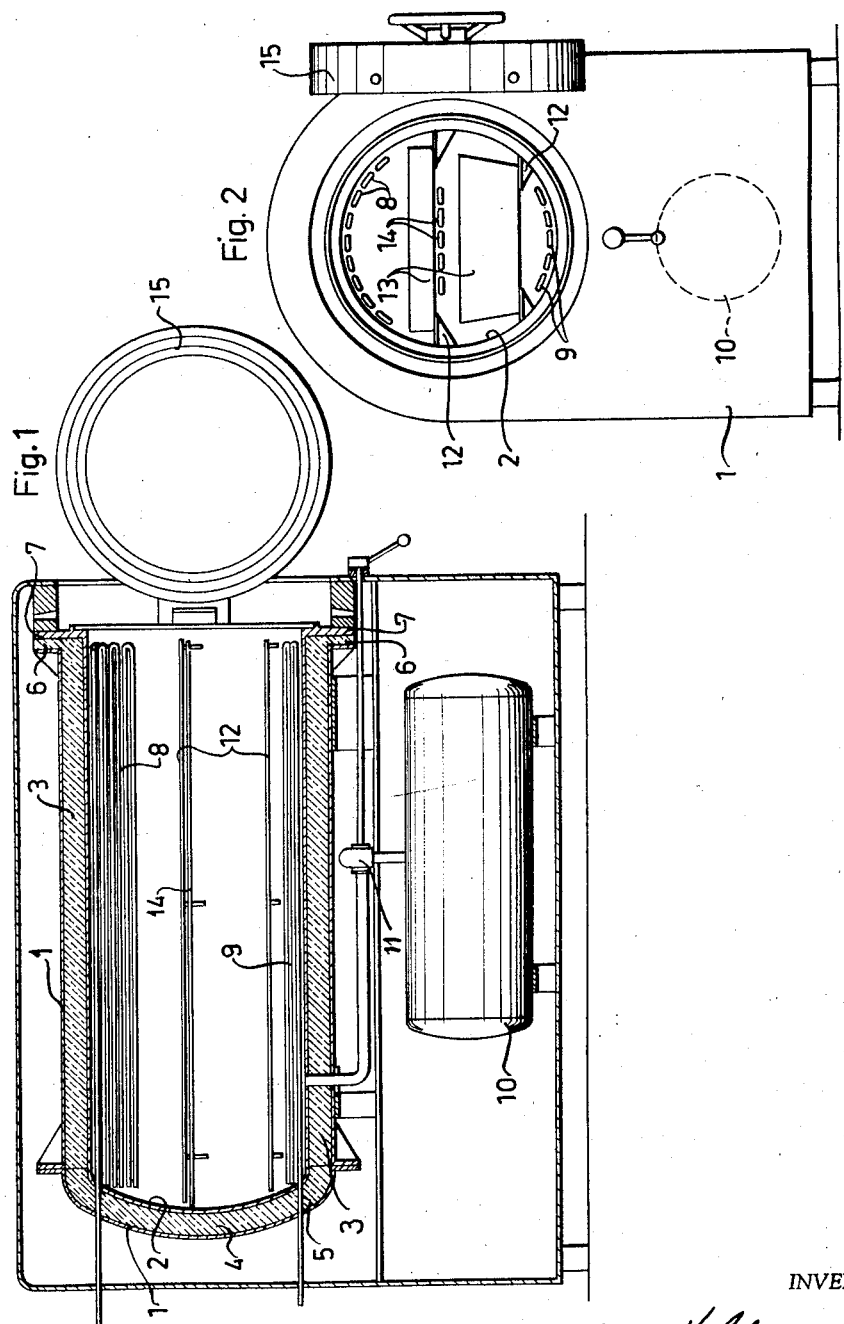

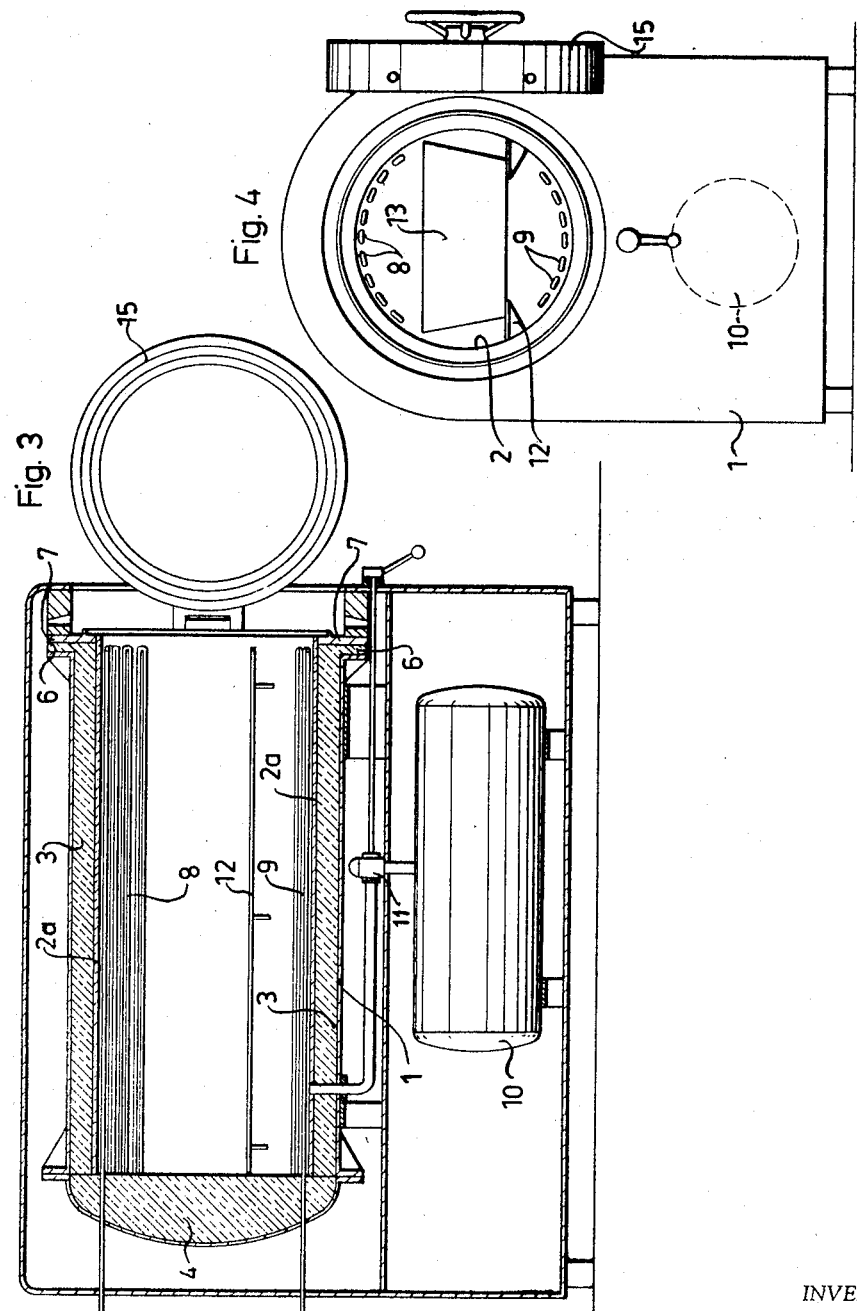

2,899,534

MEANS FOR BOILING, ROASTING, BAKING, STERILIZING OR OTHER HEAT TREATMENT OF FOOD

Väinö Valdemar Sjölund, Stockholm, Sweden, assignor to Vict: Th. Engwall & Co. Kommanditbolag, Gavle, Sweden, a corporation of Sweden Application November 28, 1956, Serial No. 624,926

Claims priority, application Sweden December 9, 1955

13 Claims. (Cl. 219—44)

It is known that heat treatment in preparing food may be carried out in a fraction of the time required in generally employed methods known since ancient time, if compressed steam is utilized, particularly compressed steam in a superheated state. However, great technical difficulties have been found to be involved in designing an autoclave, or a pressure vessel adapted to be closed hermetically and serving as an oven chamber which is resistant to interior positive pressure and which, at the same time as it is absolutely safe in use, is so easy to manage and so robust that it can be handled by an ordinary kitchen staff and also does not constantly cause shut downs in the kitchen. The fact is that if electric radiant elements, heated to a high temperature, are arranged inside the oven chamber so as to maintain the superheating of the compressed steam at the required temperature, these elements will be easily burnt. For that reason, in one known embodiment the heat conducting oven walls themselves have been constructed as heat radiating elements by arranging heater elements in or outside these walls. Hence, in this embodiment heat is supplied to the steam in the oven compartment indirectly, as such heat first has to be conducted through the material of the oven walls before it reaches the interior of the oven. In this design, however, the fact has been ignored that there is a great risk that the strength of the pressure vessel, after being used for a shorter or longer period of time, may become so impaired that the vessel may explode. The temperature, by itself appreciably high, to which the oven wall is exposed, and the intense changes of temperature and varying chemical attacks by condensation water, steam, air, fats, fatty acids, and their decomposition products, to which particularly the internal, heat radiating surfaces are exposed permanently, promote recrystallisation and formation of cracks in the material of the oven walls. Besides this, it has turned out to be practically impossible to obtain a sufficiently high temperature of the steam merely by heat radiating from the internal wall surfaces of the pressure vessel, as in that instance a higher temperature of the pressure vessel must be used than the official authorities will permit. Therefore some of the required heat must necessarily be supplied by means of radiant heater elements arranged inside the oven chamber. As on the other hand the oven chamber has to be provided with as small a cross sectional area as possible, with regard to the strength of the pressure vessel, most of these elements must be placed immediately adjacent to the inner surfaces of the oven walls. Locally, that is, on those spots positioned immediately adjacent to the radiant elements, said surfaces will be exposed to such an intense radiation that the said recrystallisation of the material will be still more accentuated.

For this reason as low a temperature of the heater elements as possible is aimed at but in this connection difficulties arise with regard to heat losses by heat radiation directed outwardly, if these elements shall be able to maintain the steam atmosphere in the oven at a highly superheated state.

The main object of the present invention is to provide an arrangement and a method, rendering it possible to eliminate the aforesaid deficiencies.

The arrangement according to the invention is substantially characterized in that an outer casing or shell is arranged to take the steam pressure prevailing in the oven chamber during operation and that this outer casing is insulated from the oven chamber by heat insulating material arranged on the inner side of the casing, said material having such thickness and being of such character that in operation the outer casing will obtain a considerably lower temperature than that of the compressed steam heated to superheated temperature in the oven chamber by means of heater elements arranged in this chamber.

One object of the invention is, by means of this heat insulation, to maintain the temperature of the outer casing essentially lower than the temperature of the steam atmosphere in the oven chamber. The excellent heat insulation enables the steam atmosphere in the oven chamber to be maintained in a highly superheated state (as at 480–660° F.) without the temperature of the heater elements having to exceed, for instance, 660–840° F. The heater elements in the oven chamber supply heat to the steam in the oven chamber by radiation and/or conduction action. A further object of the invention is to supply all the heat required for maintaining the steam in the oven chamber in superheated state, from these heaters, situated inside said chamber, by radiation and/or conduction action.

In one embodiment of the invention the insulation material entirely or partly forms the inner surface of the oven chamber, but the inner surface of the insulation may also be entirely or partly lined with good heat conducting material, such as thin sheet metal or other metallic lining which itself does not necessarily need to withstand the steam pressure, as this pressure is taken by the outer casing or shell. It is not necessary that the inner metallic lining covers the entire insulating layer, but it may also be made as a steam tight internal container preventing steam from coming into contact with the insulating layer. The latter preferably bears against the pressure taking outer casing and transmits the pressure in the oven chamber to said outer casing, which is comparatively cool and may have comparatively large dimensions, which however is not desirable with respect to the inner sheet metal lining which must be heated as quickly as possible. The inner sheet metal lining has for its object, among other things, to reflect the radiant heat from the heater elements and therefore it should have a bright inner surface being, for instance, enamelled, white painted, smooth, or polished, and, for instance, made of steel. The sheet metal lining may also function so as to support and unite the insulating layer, particularly when the latter layer is made of a material in powder form. In this instance the inner lining bears against the insulating layer which in turn transfers the pressure stresses to the outer casing.

The heat insulation has several tasks to fulfil. Firstly, the insulation involves a saving of energy consumed for the heat treatment of the food. Secondly, the insulation renders it possible to dimension the material of the outer casing of the oven or pressure vessel thinner than if heat had to be supplied through the walls of the pressure vessel, for no regard need be paid to the fact that the tensile strength of the outer casing is highly impaired when heated to high temperatures. Thirdly, the insulation protects the internal surface of the outer casing against corrosion, which of course will be particularly severe if superheated steam alternating with condensation water is permitted to attack the wall surface. Fourthly, the insulation protects the surface of the outer pressure-taking casing against direct heat radiation from the radiant elements arranged in the oven chamber. This is of especially great important as it has become evident that an uninsulated surface of the outer casing in the long run will be so severely affected by radiation from highly heated radiant elements, arranged immediately adjacent to the surface of the casing, that the strength of the latter will be highly impaired. As pointed out, previously, the intense heat radiation will cause a recrystallisation and formation of microscopic cracks in the material of the parts of the casing surface most exposed to the radiation. This in turn will give occasion to corrosion and attacks by steam and condensation water, and peeling off of the material, all of which must be avoided.

The heat insulation may consist of various materials such as asbestos, possibly in powder form, diatomite, aluminium oxide, bentonite, china clay, chalk, silica sand, magnesia, limestone, iron ochre, glass wool, slag wool, mineral wool or other mineral material with low thermal conductivity. The thickness of the layer may vary from case to case but could be, for instance, approximately $3/8''$ to $1\frac{1}{4}''$. Possibly several different layers may be employed. If desired a binding agent may be used, for example, impregnation with water glass or silicone and the whole insulation unit may be subjected to heat treatment at a considerably higher temperature than that at which the pressure vessel or oven is to be used in operation. According to one embodiment of the invention this insulation is compacted and manufactured in such a way that it will not be compressed to any appreciable extent when the inner metallic lining is pressed against the heat insulating layer due to the steam pressure prevailing inside the oven chamber and possibly also due to the thermal expansion of the metal. According to one embodiment of the invention the insulation may consist of one or more layers of asbestos cloth, asbestos millboard, or analagous material in the shape of sheets. Among other materials foamed gypsum, cellular cement, and Sorel's cement may be mentioned. Possibly the insulating layer may be attached to the surfaces of the outer casing and/or the inner casing.

In the case that the internal surface of the oven chamber in itself consists of heat insulation, that is to say without any internal metallic lining, this layer may possibly consist of fire resisting or heat resisting glass, for instance glass containing borate, such as so called Pyrex glass. According to one embodiment of the invention this heat insulating layer is covered with a specular coating on one or both sides, for instance of silver. Such a coating may also be arranged in the interior of the insulating layer.

Insulating layers of the type now described are very well adapted for the task of forming a layer reflecting the rays of heat, especially if the oven is cylindrical in shape. In such an embodiment of the oven it is suitable to make the heat-ray-reflecting layer in the form of a separate unit such as a glass cylinder with a thickness of, for instance, $5/32''$ to $3/16''$, and an outer diameter which may be approximately $3/4''$ less than the inner diameter of the outer casing of the oven. Probably the best way would be to make the glass cylinder of two contiguous layers or two layers combined with one another, in accordance with the so-called off-hand method, and to apply the specular layer between these two glass layers. The space between the glass cylinder having the specular surface, and the inner casing of the oven chamber may be filled with some insulating powder but, preferably, the space is filled with yarn, fabrics, or carpeting of asbestos, glass fibers, or the like, wound about and onto the glass cylinder.

The outer casing or shell may consist of steel, boiler plate, or the like, having an arbitrary shape, such as cylindrical, or the casing may have the shape of an elongated parallelepiped. The inner metallic lining inside the insulation may also consist of steel (possibly stainless steel), iron, aluminum, or other metallic material and may be made very thin as it does not necessarily have to take any pressure stresses. The inner lining, which for instance is cylindrical in shape, may for example be attached to the outer casing at one end wall by means of bolts or by welding, while a door adapted to be closed hermetically, may be provided at the other end wall. The insulating layer may cover one and all sections of the outer surfaces of the inner lining including the door or alternatively the cylindrical part only of said lining.

Some embodiments of the invention are illustrated in the accompanying drawings, in which Figure 1 is a longitudinal section of one embodiment of the oven;

Figure 2 is a cross section of the embodiment according to Figure 1;

Figure 3 is a longitudinal section of another embodiment of the oven;

Figure 4 is a cross section of the embodiment according to Figure 3.

In the embodiment of the invention shown in Figures 1 and 2 the autoclave or oven comprises three elements or layers, comprising an outer cylindrical casing or shell 1 of steel or boiler plate and capable of withstanding the total steam pressure, an inner cylindrical lining or container 2 which consists of thin plate and does not necessarily need to withstand the steam pressure by itself and which preferably has its internal surface polished, and one or more heat insulating layer portions 3, 4 and 6 placed between elements 1 and 2, said insulating layer portions completely filling the space between elements 1 and 2. The cylindrical layer portion 3 comprises, for instance, asbestos cloth which is firmly wound round the inner cylindrical container 2 in several turns. Layer portion 4 may consist of a plurality of sheets, for instance of asbestos, which are soaked with some heat resisting binder such as water glass or silicone, also serving as binding agent for attaching the insulation to the stationary end wall of pressure vessel 1. A separate layer portion 5, for instance comprising some filling of insulating material, may possibly be fitted to support the section intermediate the cylindrical shell or envelope portion and the end wall of the inner, thin metallic lining or container 2. Layer portion 6 may serve as a gasket ring between an outwardly directed flange 7 at the opening of inner container 2, and the opening of casing or pressure vessel 1. A rim rests against this flange 7 and carries the door 15, by means of which the oven may be hermetically closed, and which may be insulated if desired.

The inner container 2 may also be designed in such a manner that it may be inserted into and withdrawn from the outer vessel 1. The invention among other things enables the employment of a comparatively thin insulating layer 3, 4 due to the fact that the internal surface of the metallic container 2 may be made so bright that it can reflect practically all of the heat radiation coming to said surface. This is of great importance as space is saved and the outer casing 1 may be made smaller whereby it will also become stronger. The metallic inner lining 2 also prevents parts of insulating layer 3, 4 from loosening which might lead to corrosion of the inside of pressure casing 1 from steam, air, and condensation water. Hence, one of the purposes of the inner metallic lining 2 is that it protects the insulating layer 3, 4, and still another advantage is that lining 2 enables material in powder form without a binder to be used in insulating layer 3, 4. As a matter of course, layers 2 and 3, lining the outer pressure casing 1, may be replaced by new ones if they become damaged in one way or another, but such a replacement of these internal parts will involve comparatively large costs and a certain discontinuance of service while repairing. For this reason it is of great importance that insulation 3, 4 is protected by the metallic inner lining 2 and rendered fit for operation during a fairly long period of time.

The steam boiler 10 supplies steam to the interior of container 2. Arranged in the steam pipe line between the boiler and the container 2 is a steam valve 11 which may be operated from outside of the oven, and normally is open in operation. Inside the oven, brackets or carrying members 12 are arranged in order to support trays 13 or the like, in which the food is placed during the heat treatment. Preferably the side walls of these trays may be perforated so as to facilitate the circulation of steam and also to improve the effect of radiation upon the food. Heat radiating electric resistance elements 8, 9 and 14 may be arranged at different levels in the oven and may be switched on individually if desired. Radiant elements 8 provide "top heat" which is required if a roast crust is desired upon the articles of food placed in the upper tray 13. Radiant heaters 9, which always should be switched on during the heat treatment, are probably those which most effectively contribute to maintaining the superheating of the steam during the treatment, but of course they also serve in keeping the bottom of the lower tray at the required temperature. Radiant elements 14 have a similar task as elements 9 by efficiently contributing to maintaining the superheating of the steam and keeping the bottom of the upper tray at the desired temperature, but, if desired, they may possibly also provide a roast crust of the food being in the lower tray.

The heater elements may be designed and arranged in various ways. They may comprise electric resistance wires, preferably protected by outer tubes, for instance arranged in coils, and being mounted inside the oven chamber at a short distance (for instance $3/16''$ to $3/8''$) from the inner wall of the oven chamber, preferably in such a manner that the distance between two adjacent coils of the elements everywhere will be approximately the same so that the heat radiation will become as uniform as possible and distributed all over the oven chamber as well as over the inner surfaces of the metallic inner lining 2, which will reflect the radiation to the interior of the oven chamber.

If the oven chamber is shaped like a long cylinder, the heat element may run as a helical spiral in the surface of a cylinder co-axial with the oven chamber and having a diameter which is approximately $3/8''$ to $3/4''$ shorter than that of the inner cylinder surface of the metallic inner lining 2. The heat elements may also run in straight lines approximately parallel to the cylinder axis at a distance of approximately $3/16''$ to $3/8''$ from the inner surface of the oven chamber. If the oven chamber is shaped like a long parallelepiped, the heat elements may be applied inside the oven chamber along the surface approximately uniform with and parallel to said chamber, the distance of said surface from the inner surface of the oven chamber being approximately $3/16''$ to $3/8''$. The heat elements may run parallel to the axis of the long chamber or else around the oven chambers at right angles to the longitudinal axis of the oven.

For instance, the radiant elements may be mounted on a frame in such a manner that the elements together with the frame may be readily inserted into and withdrawn from the oven chamber while retaining its shape which is selected according to the shape and size of the oven chamber. The radiant elements may also be assembled with the inner metallic lining 2 by means of insulating device into a unit which readily may be inserted into and withdrawn from the oven chamber. This frame may rest upon insulating supporting members which in turn rest upon the surface of the heat insulating layer or upon the outer casing.

Furthermore, the heat elements may be partly lowered into grooves in the heat insulating surface, facing the oven chamber.

The arrangement shown in Figures 3 and 4 differs from that shown in Figures 1 and 2 substantially only in so far as the internal surface of the oven consists of heat resisting glass 2a, which covers the cylindrical part 3 of the insulating layer but may also cover the end wall layer 4. The oven chamber is charged with a tray 13 but of course also several trays may be employed. In the construction shown in the drawing at least insulating layer 4 has to be absolutely compact so that steam cannot enter into the same and reach the inner surface of pressure casing 1.

In preparing food according to the invention, it has turned out to be eminently advantageous to heat the oven chamber before the food is placed in the same so that the atmosphere in the oven chamber will have a higher temperature than that of the steam entering the oven chamber before the food is placed in said chamber. In the first place, this step serves not only the purpose of accelerating the treatment by avoiding condensation of water upon the food and the oven walls in starting, but also of developing the desired surface of the food and preserving the easily destroyable flavouring and vitamins of the same. The heating may possibly take place after the oven chamber has been closed hermetically by means of door 15, and it should take place at such a high temperature that the atmosphere in the oven chamber and the inner surface of this chamber, but not the outer casing 1, will assume a considerably higher temperature than that corresponding to the temperature of saturated steam having the same pressure as that of the steam later entering the oven chamber. Thereupon food is placed in the oven and subsequently steam is introduced into the oven chamber from boiler 10 so that the food will be heat treated in an atmosphere of superheated steam at a pressure of approximately 15 to 45 p.s.i.g. (preferably 30 p.s.i.g.) although higher as well as lower pressures may be taken into consideration. The temperature of outer casing 1 will be substantially lower, due to the insulation 3, 4, than the temperature of the steam in the oven chamber and the temperature of the inner surface of said chamber.

The heat treatment of the food is suitably performed at approximately 265 to 570° F. and should preferably not exceed 705° F., the temperature of the heater element not exceeding approximately 750 to 840° F. In roasting of meat the oven chamber is preferably heated to 520° F. but the temperature may to good advantage attain any number of degrees between, for instance, 480° F. and 660° F., and the temperature of the radiant elements does not need to exceed 660 to 840° F. In boiling, especially of vegetables and the like, the bottom and side walls of the oven chamber should first be heated to a temperature which is 50 to 212° F. higher than that of the steam introduced later on. In this case the heat treatment may be performed with steam having a pressure of 15 p.s.i.g. and at a temperature below 570° F., preferably at approximately 265 to 340° F.

Possibly the inner wall of outer casing 1 may be coated with a layer resistant against heat and moisture, or with a preserving paint, close to which heat insulating layer 3, 4 lies.

The outer casing 1 which is capable of resisting the steam pressure may consist of metallic material but, according to one embodiment, it may also consist of heat insulating material having sufficient tenacity and tensile strength, such as Pyrex or the like. If required this insulating outer casing may be reinforced, for instance by means of embedded steel or metal wires or gauze.

What I claim is:

1. Apparatus for heat treatment of food in superheated steam under pressure, comprising the combination of an oven chamber having at least one opening for introducing said food into the chamber, at least one door for closing said opening hermetically, means for producing an atmosphere of steam under substantial superatmospheric pressure in said oven chamber, heater elements for heating said steam in said oven chamber to superheated temperature, an outer casing surrounding said oven chamber and adapted to carry the steam pressure prevailing in the oven chamber during operation, and heat insulating material arranged at and engaging the inside of said casing for transferring the pressure prevailing in the oven chamber to said outer casing and for insulating said oven chamber from said outer casing so that in operation the latter will have a considerably lower temperature than that of the superheated steam.

2. Apparatus according to claim 1, wherein the heat insulating material forms at least part of the internal surface of the oven chamber.

3. Apparatus according to claim 1, wherein the heat insulation is applied in at least one layer between the pressure carrying outer casing and an inner lining forming at least part of the internal surface of the oven chamber and consisting of heat conducting material.

4. Apparatus according to claim 1 wherein the outer casing consists of heat insulating material having sufficient tensile strength to resist the steam pressure prevailing in said oven chamber.

5. Apparatus according to claim 4, wherein said insulating outer casing is reinforced by metallic wires embedded therein.

6. Apparatus according to claim 3, wherein the heat insulating material is so dense that it will not be compressed to any appreciable extent when the inner metallic lining is pressed against the heat insulating material due to the steam pressure within the oven chamber.

7. Apparatus according to claim 1, wherein at least the portion of the heat insulating material which faces the interior of the oven chamber consists of heat resisting glass.

8. Apparatus according to claim 7, wherein the heat resisting glass is provided with a reflecting surface.

9. Apparatus according to claim 8, wherein a reflecting coating is provided within the interior of the heat resisting glass.

10. Apparatus according to claim 7, wherein the heat insulation comprises a cylinder of heat resisting glass, the outer diameter of which is less than the inner diameter of said pressure carrying outer casing, the space between said glass cylinder and said outer casing being filled with another heat insulating material.

11. Apparatus according to claim 4, wherein the heat insulating material is attached to the external surfaces of said inner lining.

12. Apparatus according to claim 1, wherein said heater elements arranged in the oven chamber have such a heat generating capacity that the amount of heat emitted from said elements is sufficient to maintain the superheated state of the steam atmosphere in the interior of the oven chamber, by radiation and contact action.

13. Apparatus according to claim 4, wherein the inner lining consists of a steam tight container.

References Cited in the file of this patent

UNITED STATES PATENTS

| | | |
|---|---|---|
| 1,345,004 | Hadaway | June 29, 1920 |
| 1,349,130 | Hadaway | Aug. 10, 1920 |
| 1,383,110 | Hadaway | June 28, 1921 |
| 1,955,289 | Greenfield | Apr. 17, 1934 |
| 2,060,434 | Vincent | Nov. 10, 1936 |
| 2,339,974 | Austin | Jan. 25, 1944 |
| 2,540,924 | Young et al. | Feb. 6, 1951 |
| 2,659,805 | Warren | Nov. 17, 1953 |

FOREIGN PATENTS

| | | |
|---|---|---|
| 24,218 of 1914 | Great Britain | Nov. 4, 1915 |

UNITED STATES PATENT OFFICE

CERTIFICATE OF CORRECTION

Patent No. 2,899,534                      August 11, 1959

Väinö Valdemar Sjölund

It is hereby certified that error appears in the printed specification of the above numbered patent requiring correction and that the said Letters Patent should read as corrected below.

Column 5, line 67, for "device" read -- devices --; column 8, line 10, for "Apparatus according to claim 4," read -- Apparatus according to claim 3, --; line 19, for "Apparatus according to claim 4," read -- Apparatus according to claim 3, --.

Signed and sealed this 16th day of February 1960.

(SEAL)
Attest:

KARL H. AXLINE                          ROBERT C. WATSON
Attesting Officer                      Commissioner of Patents